UNITED STATES PATENT OFFICE.

CHARLES SPIRO, OF NEW YORK, N. Y.

PHOTOGRAPHIC DEVELOPING-BATH.

SPECIFICATION forming part of Reissued Letters Patent No. 11,034, dated October 15, 1889.

Original No. 409,618, dated August 20, 1889. Application for reissue filed September 9, 1889. Serial No. 323,457.

*To all whom it may concern:*

Be it known that I, CHARLES SPIRO, a citizen of the United States, and a resident of the city of New York, in the county of New York and State of New York, have invented a certain new and useful Improvement in Photographic Developing-Baths, of which the following is a specification.

This invention relates to means for developing the latent images of photographic plates or sheets without a dark-room, and has for its object to provide a developing-mixture whereby a complete isolation of the developing photographic plate or sheet will be secured from the actinic rays of light, while a clear view of the developing-image may be obtained.

In developing a photographic plate or sheet in a dark-room as heretofore, in which the only light was the dim light admitted through ruby or orange colored glass used to exclude the actinic rays, it was possible for the operator to watch the progress of and control the development only by removing the plate or sheet from the developing-bath from time to time and holding it up to the light for inspection, which process was wearisome, and in many instances destructive to the plate, owing to the incomplete exclusion of the actinic rays and the, perhaps, extreme sensitiveness of the plate. To avoid these inconveniences and attain the objects of my invention, I provide a mixture consisting of any of the ordinary and well-known developers, such as pyrogallic acid and soda or hydroquinnone, in combination with a non-actinic coloring-matter, preferably orange aniline or a mixture of the same and carmine aniline, where the plate or sheet to be developed is very sensitive, which will render the mixture clear or transparent, while non-actinic. In preparing this non-actinic developing-mixture at present I take, preferably, hydroquinnone for the developer, and to one pint thereof I add a solution composed of equal parts of alcohol and water (to energize the solution) to make one ounce, and two parts of orange aniline and one pint of carmine to make half an ounce, thoroughly mixed together and dissolved, so as to form a completely-saturated and dark orange-colored solution of diluted alcohol. This solution is first well strained to remove all extraneous matter and then combined with the developer, as before stated. This mixture is poured into a developing-tray, and the photographic plate or sheet to be developed transferred from the plate-holder into the non-actinic bath thus prepared either in the dark-room, afterward admitting the light thereinto or removing the bath with the contained plate into the light, or by any well-known or approved means for effecting this transfer in the light without exposing the plate or sheet thereto. The non-actinic bath will completely exclude the actinic rays from the immersed plate or sheet, and the developing-mixture being perfectly clear the development will proceed in full view of the operator, who may thus easily note the progress of the development. When the image is found to be fully developed, the plate or sheet may be transferred in the light to a bath of any of the usual fixing agents—such as hyposulphite of soda—and the bath quickly covered with a dark cloth; or the fixing-bath may be likewise rendered non-actinic by the addition thereto of the same non-actinic coloring-matter. The transfer of the developed plate or sheet from the non-actinic developing-bath into the fixing-bath in the light may be thus effected without clouding the image, insomuch as the aniline coloring-matter forms a perfect solution, which seems to fill the pores of the gelatine film, and forms a perfectly non-actinic envelope over the film, lasting until the plate is immersed in the fixing-bath. The fixing action then immediately commencing, light has no further effect on the film.

The proportions of the developer and colored solution above given will yield a safe and efficient developer if the developing-tray is no larger than necessary to be half filled by the mixture; but the circumstances of the case and the experience of the operator will determine the depth of color in the mixture.

I hereby reserve the right to make future application for the non-actinic fixing-mixture hereinbefore referred to.

I claim as new and desire to secure by Letters Patent—

1. The combination, with a photographic developer, of a non-actinic coloring-matter, so as to produce a transparent and non-actinic developing-mixture, as and for the purpose set forth.

2. The combination, with a photographic developer, of a solution of non-actinic aniline coloring-matter, substantially as and for the purpose set forth.

3. The combination, with a photographic developer, of orange aniline, substantially as and for the purpose set forth.

Signed at New York, in the county of New York and State of New York, this 30th day of August, A. D. 1889.

CHARLES SPIRO.

Witnesses:
F. J. WALL,
CLARENCE S. BURGER.